(12) United States Patent
Fung et al.

(10) Patent No.: US 7,133,228 B2
(45) Date of Patent: Nov. 7, 2006

(54) USING DATA COMPRESSION TO ACHIEVE LOWER LINEAR BIT DENSITIES ON A STORAGE MEDIUM

(75) Inventors: Kendall H. Fung, Longmont, CO (US); David G. Dalton, Longmont, CO (US); Robert W. Warren, Loveland, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 636 days.

(21) Appl. No.: 10/683,973

(22) Filed: Oct. 10, 2003

(65) Prior Publication Data

US 2005/0078399 A1   Apr. 14, 2005

(51) Int. Cl.
 *G11B 5/09* (2006.01)
(52) U.S. Cl. .............. 360/39; 360/48; 360/29
(58) Field of Classification Search .............. None
See application file for complete search history.

(56) References Cited

U.S. PATENT DOCUMENTS

| | | | |
|---|---|---|---|
| 4,467,421 A | 8/1984 | White | |
| 4,912,570 A * | 3/1990 | Kinoshita et al. | 360/8 |
| 5,237,460 A | 8/1993 | Miller et al. | |
| 5,404,248 A * | 4/1995 | Shimoda et al. | 360/48 |
| 5,406,428 A * | 4/1995 | Suzuki | 360/53 |
| 5,592,342 A * | 1/1997 | Hall et al. | 360/48 |
| 5,644,791 A | 7/1997 | Brady et al. | |
| 5,729,228 A | 3/1998 | Franaszek et al. | |
| 5,761,536 A | 6/1998 | Franaszek | |
| 5,812,817 A | 9/1998 | Hovis et al. | |
| 5,819,214 A * | 10/1998 | Suzuki et al. | 704/229 |
| 5,862,005 A * | 1/1999 | Leis et al. | 360/27 |
| 5,864,859 A | 1/1999 | Franaszek | |
| 5,867,114 A | 2/1999 | Barbir | |
| 5,875,454 A | 2/1999 | Craft et al. | |
| 5,915,129 A | 6/1999 | Slivka et al. | |
| 5,999,508 A * | 12/1999 | Yokota et al. | 369/59.24 |
| 6,008,960 A * | 12/1999 | Belser | 360/48 |
| 6,201,654 B1 * | 3/2001 | Okamoto et al. | 360/48 |
| 6,205,104 B1 * | 3/2001 | Nagashima et al. | 369/59.14 |
| 6,317,747 B1 | 11/2001 | Bolan et al. | |
| 6,449,116 B1 * | 9/2002 | Morris et al. | 360/77.04 |
| 6,539,460 B1 | 3/2003 | Castelli et al. | |
| 6,944,742 B1 * | 9/2005 | Shoff et al. | 711/202 |
| 6,967,803 B1 * | 11/2005 | Nakamura | 360/72.1 |
| 7,046,467 B1 * | 5/2006 | Chheda | 360/51 |
| 2002/0093750 A1 * | 7/2002 | Hayami et al. | 360/29 |

* cited by examiner

*Primary Examiner*—Wayne Young
*Assistant Examiner*—Dismery Mercedes
(74) *Attorney, Agent, or Firm*—Fellers, Snider, et al.

(57) ABSTRACT

Method and apparatus for transferring data to and from a data storage medium, such as a rotatable disc in a data storage device. The medium includes a data sector field with a physical length sufficient to store a first data block at a first write frequency. A compression engine compresses the first data block to provide a reduced size, compressed data block. The compressed data block is then written to the data sector field at a second write frequency less than the first write frequency so that the written compressed data block occupies substantially the physical length of said data sector field. This achieves a decreased linear bit density and tends to increase communication channel signal to noise (SNR) ratios and reduce error rates. Data slipping is further advantageously employed so that the first data block further stores at least a portion of a second compressed data block.

27 Claims, 5 Drawing Sheets

USING DATA COMPRESSION TO ACHIEVE LOWER LINEAR BIT DENSITIES ON A STORAGE MEDIUM

FIELD OF THE INVENTION

The claimed invention relates generally to the field of data storage devices and more particularly, but not by way of limitation, to an apparatus and method for using data compression to achieve lower linear bit recording densities on a storage medium.

BACKGROUND

Disc drives are digital data storage devices which store and retrieve large amounts of user data in a fast and efficient manner. User data blocks from a host device are magnetically stored in data sector fields defined on the surfaces of one or more rotatable data storage discs (media).

Data compression techniques have been employed in disc drives and other data storage devices to achieve improved throughput and data storage capacities. As will be recognized, data compression, or compaction, generally comprises the application of a coding algorithm to a digital data block (set) to represent the data block more efficiently (i.e., with fewer bits).

The resulting compressed data block allows the data to be transmitted in a shorter period of time across a communication link. Using compressed data blocks also generally increases the ability to store additional data in a given memory device, such as an integrated circuit cache buffer, a storage disc or other medium.

While prior art approaches to employing data compression in data storage devices may have been found operable, due to the continued market demand for data storage devices with ever higher levels of performance capabilities, there remains a continued need for improvements in the manner in which data compression techniques are employed in a data storage device.

SUMMARY OF THE INVENTION

As embodied herein and as claimed below, the present invention is generally directed to a method and apparatus for transferring data to and from a data storage medium, such as a rotatable disc in a data storage device.

In accordance with preferred embodiments, the method preferably includes steps of providing a data sector field on a data storage medium with a physical length sufficient to store a first data block at a first write frequency. The first data block is compressed to provide a compressed data block. The compressed data block is then written to the data sector field at a second write frequency less than the first write frequency so that the written compressed data block occupies substantially the physical length of said data sector field.

Preferably, the second write frequency is predetermined or is calculated in relation to a resulting size of the compressed data block. Moreover, a "data slipping" technique is preferably used so that at least a portion of a second compressed data block is also written to the data sector field.

In accordance with further preferred embodiments, the apparatus comprises a data storage medium on which a data sector field is formed having a data storage memory space sized to accommodate a selected amount of data written at a first write frequency. A compression engine compresses a first data block to provide a compressed data block, the first data block having a size equal to said selected amount of data.

A communication channel subsequently writes the compressed data block to the data sector field at a second write frequency less than the first write frequency so that the written compressed data block is provided with a reduced linear bit density as compared to a linear bit density that would be achieved by writing the first data block to the data sector field at the first frequency. In this way, higher SNR ratios and lower error rates can be advantageously achieved in the communication channel.

Preferably, the communication channel additionally writes at least a portion of a second compressed data block to the data sector field. In this way, higher data storage capacities are also further achieved.

These and various other features and advantages which characterize the claimed invention will become apparent upon reading the following detailed description and upon reviewing the associated drawings.

DETAILED DESCRIPTION

Figure 1:
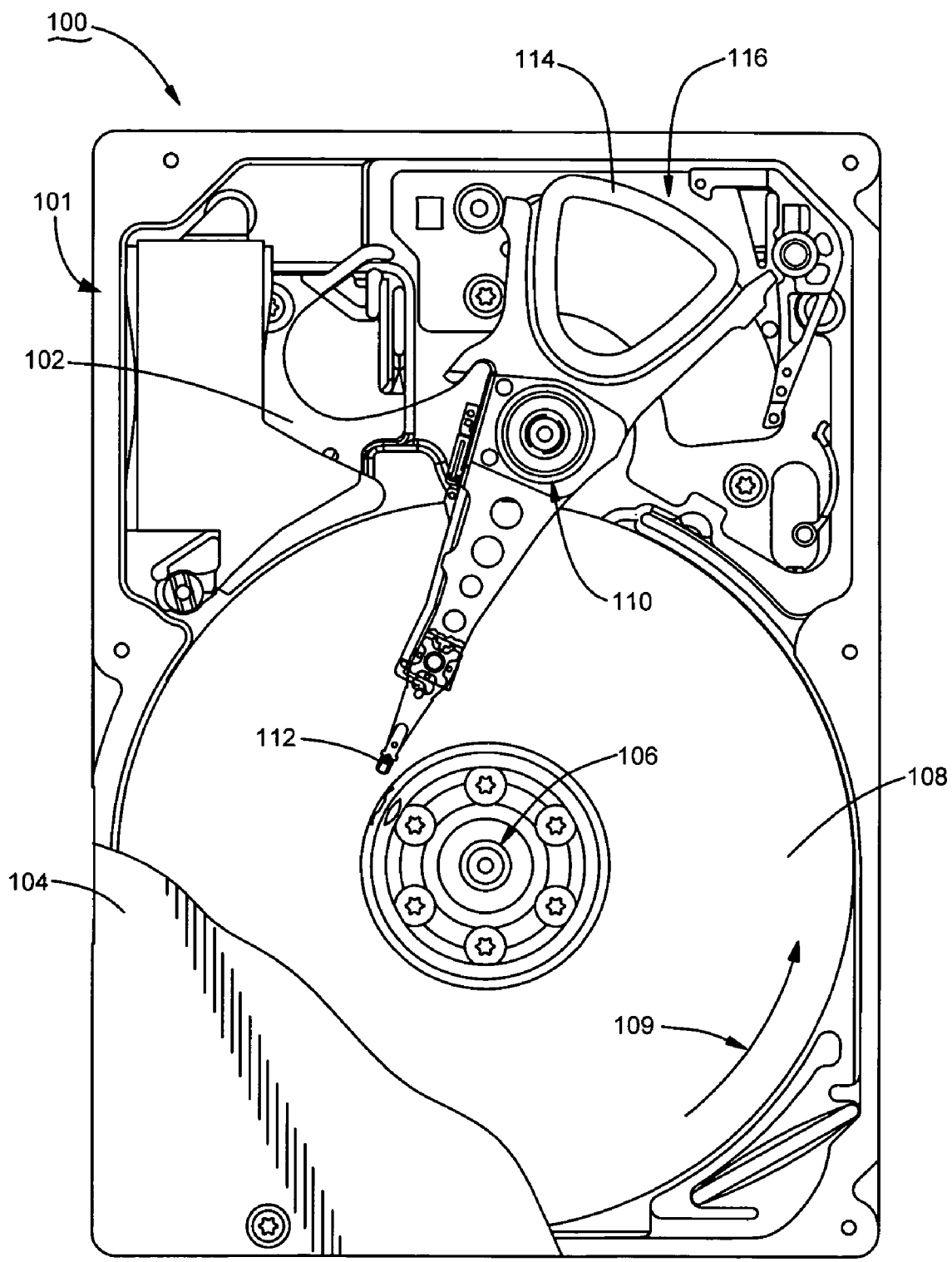
FIG. 1 is a top plan representation of a data storage device constructed and operated in accordance with preferred embodiments of the present invention.

FIG. 1 provides a top plan representation of a data storage device 100 constructed in accordance with preferred embodiments of the present invention. The data storage device is preferably characterized as a disc drive of the type which magnetically stores and retrieves digital data from and to a host device.

An enclosed housing 101 defines an internal, environmentally controlled environment for the device 100. The housing 101 is formed by a pair of substantially planar housing members including a base deck 102 and a top cover 104 (shown in partial cut-away in FIG. 1).

The base deck 102 supports a spindle motor 106 which rotates a plurality of data storage discs (media) 108 at a constant high speed in direction 109. A rotary actuator 110 supports a corresponding number of data transducing heads 112 adjacent data recording surfaces of the discs 108. The heads 112 are aerodynamically supported adjacent the disc surfaces via recirculating fluidic currents established by the high speed rotation of the discs 108.

The actuator 110 is pivotally rotated through application of current to an actuator coil 114 of a voice coil motor (VCM) 116. As the actuator 110 rotates, the heads 112 are brought into alignment with data tracks defined on the disc surfaces.

Figure 2:
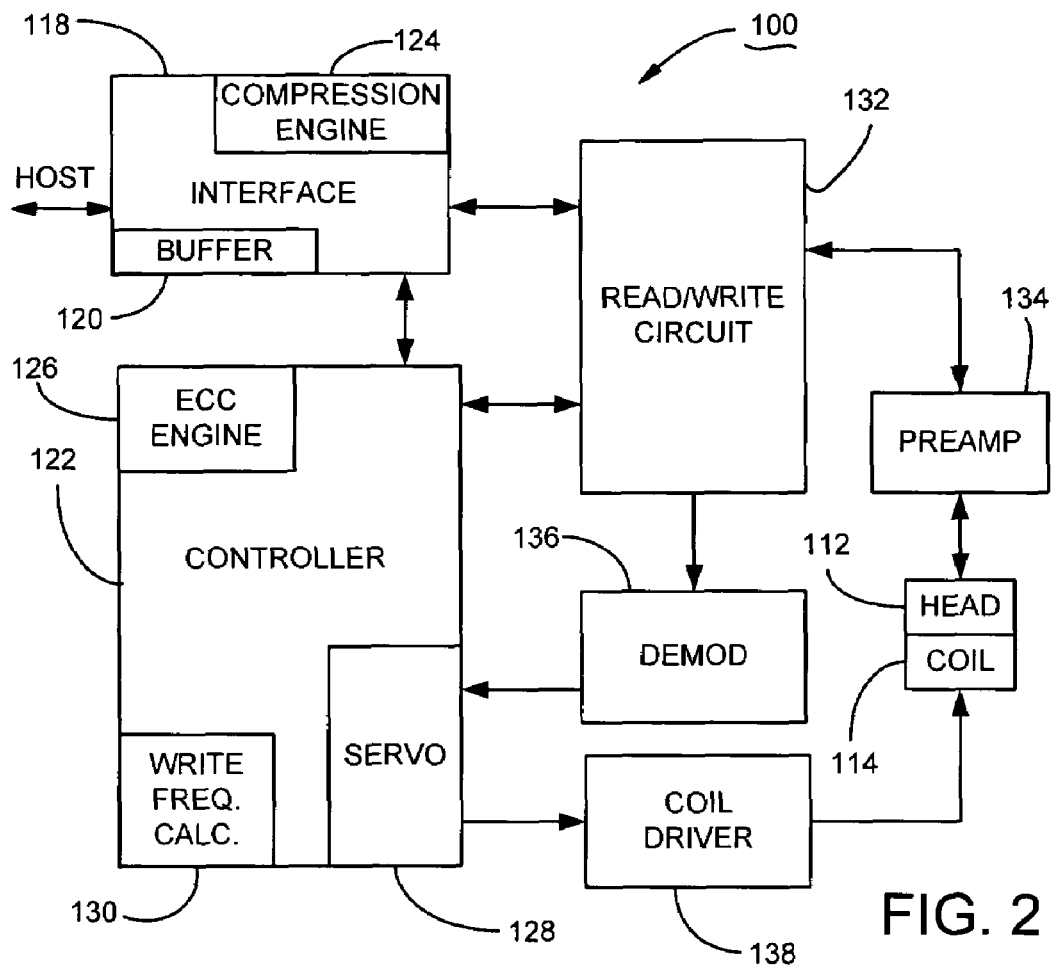
FIG. 2 is a functional block representation of the data storage device of FIG. 1.

FIG. 2 provides a generalized functional block diagram of the data storage device 100. Control electronics shown in FIG. 2 are substantially provisioned on a communications and control printed circuit board (PCB) mounted to the underside of the base deck 102 (and hence, not visible in FIG. 1).

A hardware based interface circuit 118 communicates with the host device via an industry standard communication protocol (such as, but not limited to SCSI, IDE, ATA, etc.) and includes a buffer memory space 120 (buffer) and a compression engine 122. The buffer is a volatile memory space (SRAM, etc.) which serves as a temporary storage location for data being transferred between the host and the discs 108. Operational programming routines are further loaded into the buffer 120 for use by a top level controller 124 during device operation. The compression engine 122 compresses and uncompresses (decompresses) data blocks as explained below.

The controller 124 provides top level control for the device 100. The controller 124 includes various operational modules including, for example, an on-the-fly error correction code (ECC) engine 126, a servo engine 128 and a write frequency calculation unit 130. Each of these modules are preferably realized in firmware (programming) executed by the controller 122, although these modules can also be provided in hardware, as desired. Contrawise, the compression engine 122 of the interface circuit 118 can also be realized in firmware executed by the controller 122, as desired.

A read/write (R/W) circuit 132 applies run-length limited (RLL) encoding, serialization and pre-write compensation to data to be written to the discs 108 during a data write operation. The output of the R/W circuit 132 preferably comprises a time-varying NRZI (non-return to zero inverted) signal which is provided to a preamplifier/driver circuit 134 (preamp). The preamp 134 in turn applies corresponding write currents to the selected head 112 to write a data pattern to the disc 108 as a series of magnetic flux transitions (reversals) corresponding to the NRZI signal.

During a subsequent read back operation, the selected head transduces the data pattern from the disc 108 to output a readback signal. The preamp 134 preamplifies and filters the readback signal, and the R/W channel 132 decodes and recovers the originally stored, encoded data from the readback signal and provides the same to the interface 118 for subsequent transfer to the host. For reference, the R/W circuit 132, preamp 134 and head 112 are collectively referred to herein as a "communication channel."

Positional control of the heads 112 to enable the device 100 to carry out read and write operations is provided by a servo control loop comprising the head 112, preamp 134, initial stages of the R/W circuit 132, a demodulation (demod) circuit 136, the servo engine 128, a coil driver circuit 138 and the coil 114. As the servo control loop preferably operates in a conventional manner, no further discussion thereof will be provided for purposes of brevity.

Figure 3:
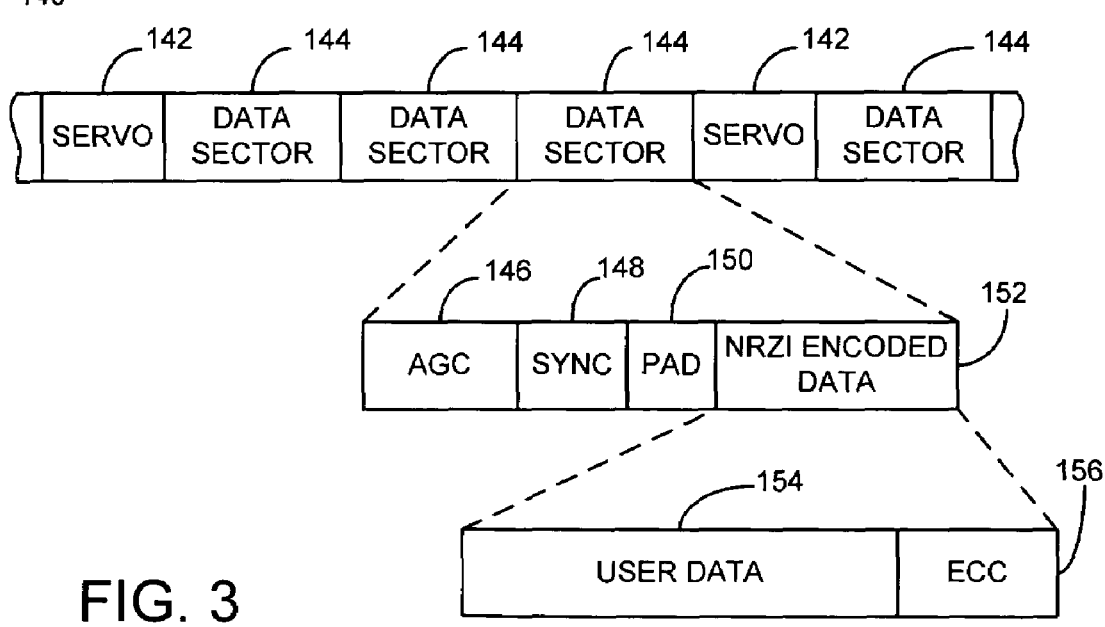
FIG. 3 illustrates a generalized format for the data recording surfaces of the data storage device of FIG. 1.

FIG. 3 illustrates a generalized format for the data recording surfaces of the discs 108. Each of the data recording surfaces is provided with a plurality of concentric tracks, a portion of one being depicted at 140. Embedded servo fields 142 are angularly arrayed around the circumference of the track 140 and store positional control data used by the servo loop. Data sector fields 144 are formed in the areas between adjacent servo fields 142 during a formatting operation.

While a variety of data sector field formats can be employed as desired, each data sector field 144 in FIG. 3 is shown to preferably include a leading automatic gain control (AGC) field 146, a synchronization (sync) field 148, a pad field 150 and a NRZI encoded data field 152.

The AGC field 146 preferably stores an oscillating pattern (such as a 2T pattern) at a selected frequency and amplitude. This allows the R/W circuit 132 to obtain read frequency lock with a phase lock loop (PLL) and to set gain levels in AGC control circuitry (neither shown in FIG. 2) to enable the circuit to correctly detect the contents of remaining portions of the sector.

The sync field 148 is a unique bit pattern which, when recognized by sync detection circuitry (not shown) of the R/W circuit 132, enables the R/W circuit 132 to identify the beginning of the NRZI encoded data field 152. The optional pad field 150 serves as a buffer region to prevent the inadvertent overwriting of the sync field 148.

Encoded data blocks from the interface circuit 118 are stored in the NRZI encoded data field 152. As further shown in FIG. 3, such data blocks are generally composed of a fixed-size block of user data (represented at 154), and an associated number of error correction code (ECC) bytes (represented at 156). The size of the user data will generally be established by the host device operating system at the time of formatting; typical values include 512 bytes, 1024 bytes, 4096 bytes, etc.

The number of appended ECC bytes will depend upon the error correction scheme employed by the ECC block 126. As will be recognized, the ECC bytes are used to detect and correct up to selected numbers of errors in the recovered data during a read back operation. For purposes of providing a concrete example, it will be contemplated that the data field 152 is configured to store 512 bytes of encoded user data and 48 bytes of ECC bytes, for a total of 566 encoded bytes.

In a conventional system, the frequency of the AGC pattern in the AGC field 146 is preferably selected so that a first encoded data block of 566 bytes will just "fit" the physical length of the data field 152. In other words, the 566 bytes of user data and ECC bytes will generally be provided with a selected linear bit density (i.e., bits per linear unit of measure) along the data field 152 as determined by the frequency of the AGC pattern and the rotational speed of the disc 108, with the linear bit density selected to substantially fill the data field 152.

As those skilled in the art will recognize, market demands continue to push for data storage devices with ever higher data storage capacity and throughput performance characteristics. This has led to a continuing trend whereby device providers have attempted to achieve higher linear bit densities, as well as higher track densities (i.e., narrowing the tracks and bringing them closer together), to allow more data to be stored on a given disc surface. Employing data compression so that compressed data blocks are written to the recording surfaces has also been proposed in the art as a way to increase storage capacity.

As linear bit densities increase, it generally becomes harder to correctly detect the underlying recorded sequence. This is because successive flux transitions become closer together on the disc surfaces, increasing the effects of factors such as partial erasure, media noise and other interference which tend to decrease signal to noise (SNR) ratios and increase error rates of the R/W circuit.

Accordingly, preferred embodiments of the present invention are generally directed to using data compression techniques to decrease areal density, and therefore increase channel SNR ratios and decrease error rates. This is preferably carried out as illustrated by FIGS. 4 and 5.

Figure 4:
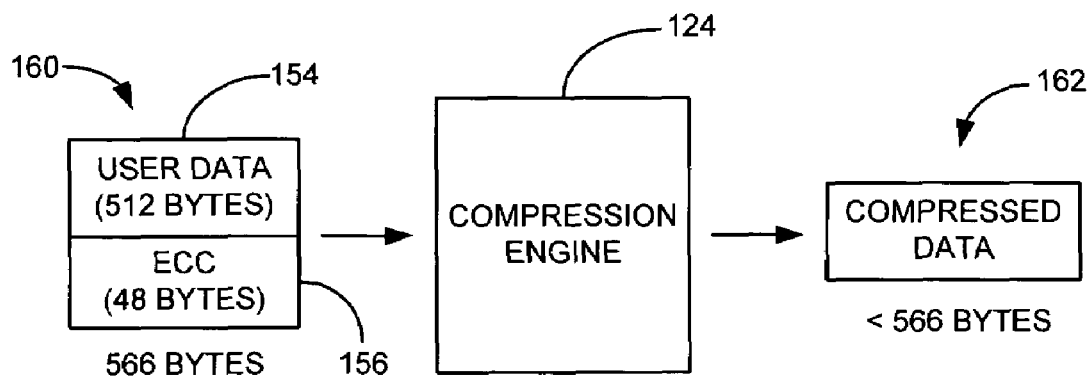
FIG. 4 is a functional block diagram to generally illustrate a compression technique employed by preferred embodiments of the present invention.
Figure 5:
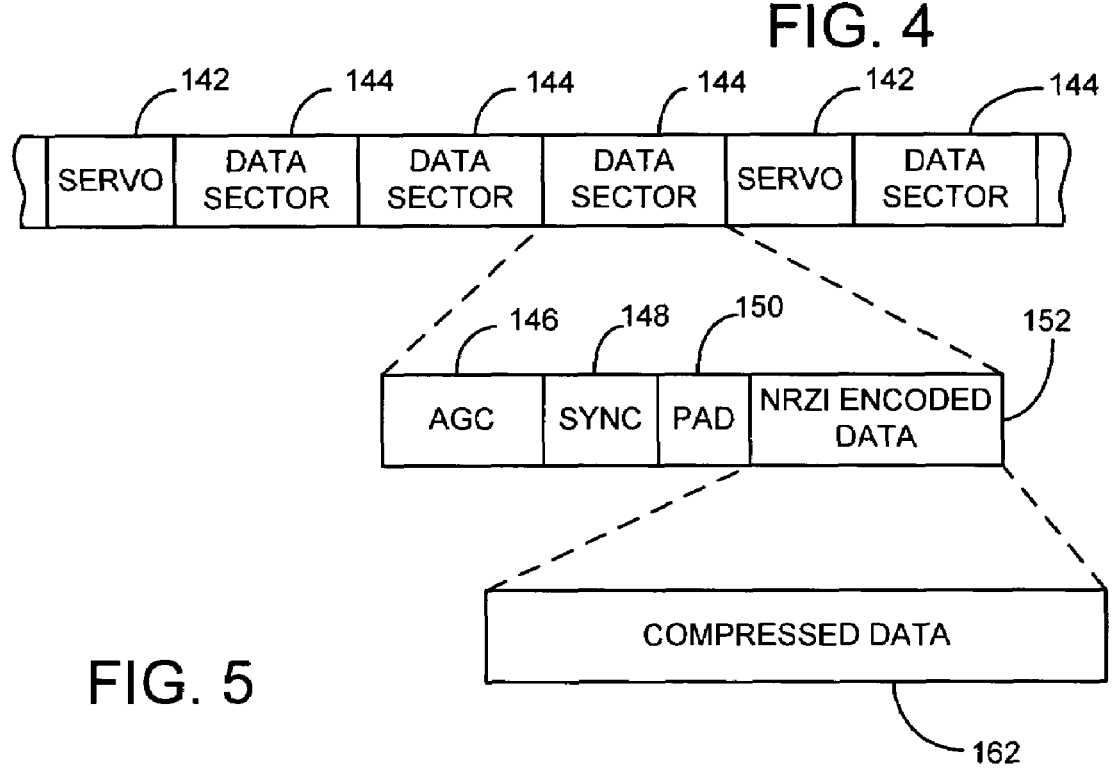
FIG. 5 corresponds to FIG. 3 and generally represents a preferred manner in which compressed data from FIG. 4 are stored on the data recording surfaces.

FIG. 4 shows a functional block diagram of the compression engine 124 to illustrate how a first data block 160 of selected size (in this case 566 bytes of user data and ECC) is compressed to form a reduced size compressed data block 162. Preferably, the compression engine employs a Limpell-Zev or other algorithm to achieve a modest compression rate, such as on the order of 8–10%. In other words, the compressed data block is preferably only on the order of about 90% to 92% of the size of the uncompressed first data block 160 (i.e., the first data block 160 comprises 566 bytes and the compressed data block 162 comprises on the order of about 510 to 520 bytes). Of course, other compression rates, either higher or lower, can readily be used as desired.

As those skilled in the art will recognize, a wide variety of different compression algorithms are known in the art, and the reduction rate for a given algorithm when compressing a given data block will often depend largely on the type of bit sequences present in the data block. Thus for example, some high powered compression algorithms might be able to achieve compression rates of 80% or more of some data blocks, 50% for other data blocks, etc.

A focus in the present case, however, is preferably directed to achieving consistency in compression rates rather than in achieving maximum compression rates. The compression algorithm used by the compression engine 122 will preferably be selected so as to achieve at least an 8% reduction in size in the resulting compressed data block for essentially all of the different data block types. Moreover, algorithms that tend to consistently provide compressed data blocks in the 8% to 10% range are preferred over algorithms that provide higher compression rates (e.g., 50%, 80%) for certain types of data blocks and lower compression rates (e.g., 5%, 10%) for other types of data blocks.

A reason for this preference for consistency in the sizes of the resulting compressed data sets can be understood with a review of FIG. 5. FIG. 5 corresponds largely to the format shown in FIG. 3 above, except that it will be noted that the compressed data block 162 obtained in FIG. 4 is written to the data field 152. Because the compressed data block 162 represents a modest reduction in the total number of bits as compared to the size of the data field 152, it will be recognized that the compressed data block 162 can be written at a second, lower write frequency, and thereby attain a lower linear bit density, as compared to the first data block 160.

Figure 6:
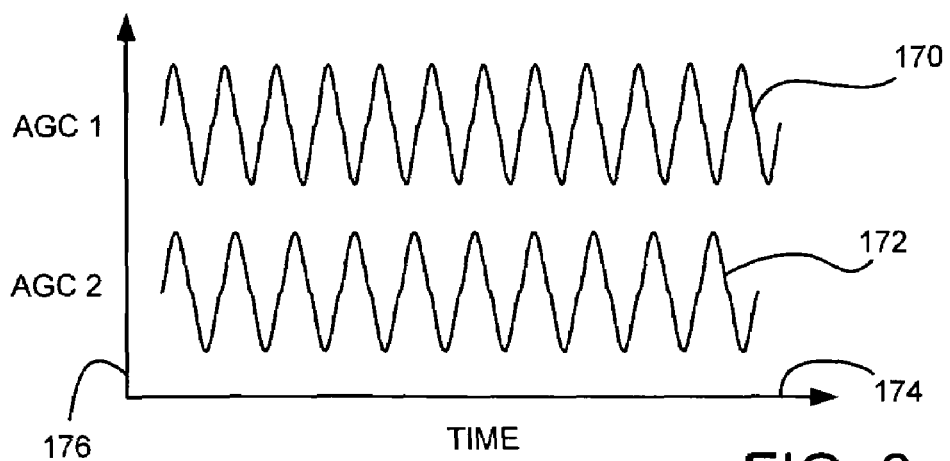
FIG. 6 provides first and second automatic gain control (AGC) curves to help illustrate an advantage of storing data as set forth in FIG. 5.

This is further graphically represented by FIG. 6, which provides first and second AGC curves 170, 172 (AGC 1, AGC 2) plotted against an elapsed time x-axis 174 and a common amplitude y-axis 176. The AGC 1 curve 170 represents a higher frequency at which the first data block 160 would be written and subsequently read back; the AGC 2 curve 172 correspondingly represents the lower frequency at which the compressed data 162 can be advantageously written and subsequently read back.

It has been found that significant gains in SNR ratios and significant reductions in error rates can be realized by the R/W circuit 132 using the compression engine 124 in the foregoing manner. Generally, it has been found that for each 1% of compression employed, about a 0.18 dB increase in SNR is achieved. Thus, using a modest compression rate of around 8% across the board results in about 1.44 dB increase in SNR, which is a substantial improvement.

Figure 7:
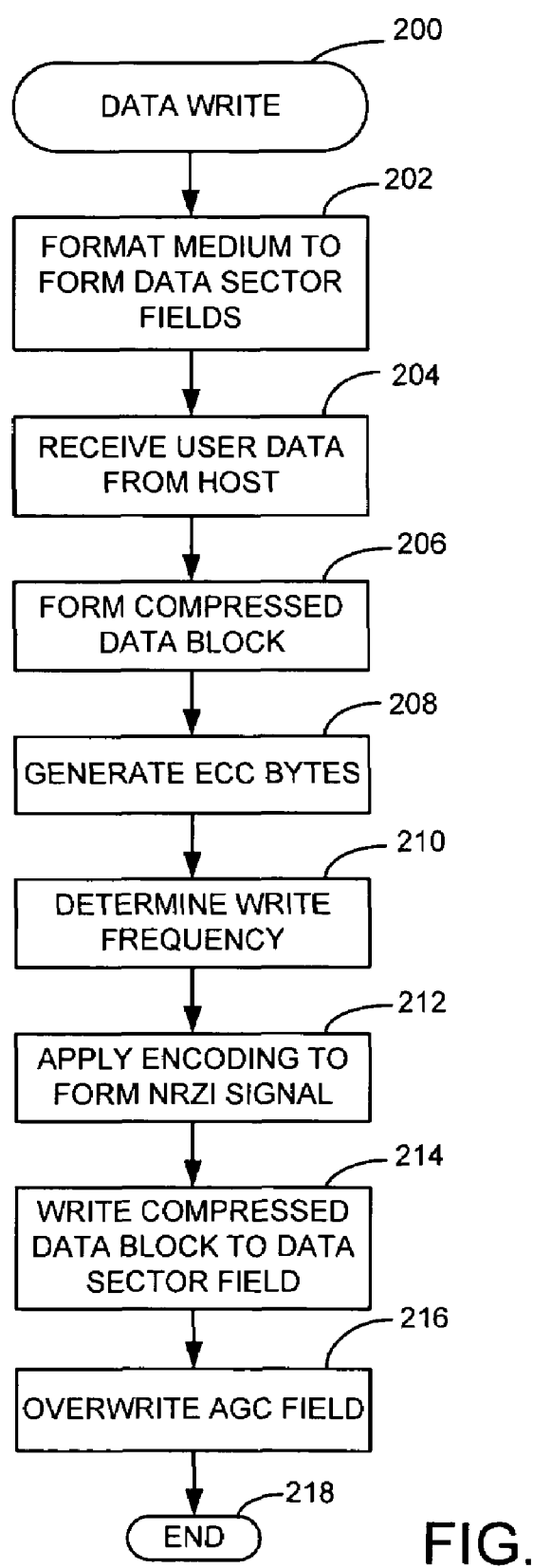
FIG. 7 is a flow chart for a DATA WRITE routine, generally illustrative of steps carried out in accordance with preferred embodiments of the present invention to write data to the data storage medium of FIG. 1.

FIG. 7 provides a flow chart for a DATA WRITE routine 200, generally illustrative of steps carried out in accordance with various preferred embodiments of the present invention to write compressed data to the data sector fields 144. It will be noted that FIG. 7 represents a simplified, generalized sequence so that some steps may be performed in a different order than that shown, as desired.

At step 202, a data storage medium (such as each of the discs 108) is initially formatted to form a number of the data sector fields 144 thereon. As discussed above, the data sector fields 144 are each provided with a physical length such that a first data block (such as 160) can be stored therein at a given linear bit density and at a first write frequency (such as 170). In other words, the data sector fields 144 are preferably provided with "standard" sector sizes as would be used if compression were not employed.

Constant angular velocity (CAV) and zone based recording (ZBR) techniques are preferably utilized so that the tracks 140 are grouped into a number of concentric zones, or bands, with each track in each zone having the same number of data sector fields 152. All of the data sector fields 144 are preferably provided with about the same common physical length; thus, zones toward the outermost diameter (OD) will tend to have higher numbers of data sector fields 144 per track, and zones toward the innermost diameter (ID) will tend to have lower numbers of data sector fields 144 per track. It follows that the R/W circuit 132 will be configured to use a range of different write frequencies from OD to ID in around a 2:1 to 3:1 ratio, with higher write frequencies being used toward the OD and lower frequencies being used toward the ID.

In some preferred embodiments, the decision is made beforehand to use a substantially the same target linear bit density for all of the data sector fields 144. For example, a target compression rate of 8% is selected so that all of the compressed data fields will consist of about 520 bytes. This can be maintained, for example, by adding pad (dummy) bits to the end of a given compressed data block that is less than 520 bytes to bring the total number of bits up to the target size.

In this way, the write frequencies that will be used to write (and subsequently read back) the compressed data from each zone are pre-established, and appropriate 2T patterns (e.g., AGC 2 curve 172) are preferably written to each of the AGC fields 146 during the formatting step 202.

In other preferred embodiments, the initial frequency of the AGC fields 146 is set to the first frequency (i.e., AGC 1 curve 170) during step 202, and this frequency is subsequently overwritten, as discussed below.

Continuing with the flow of FIG. 7, during normal operation one or more blocks of user data are received from the host device at step 204 for storage to the recording medium. Typically, when command queuing and write caching are employed, the interface circuit 132 will temporarily store the user data in the buffer 120, report to the host device that the data have been written to disc, and then schedule the subsequent processing, compression and writing of the data. It will be noted that for the present example, it is contemplated that the user data received during step 204 comprises the user data 154 (512 bytes) discussed in FIGS. 3 and 4.

In a preferred embodiment, the compression engine 126 (FIG. 4) compresses the user data blocks at step 206, and the ECC engine 126 operates to calculate the appropriate ECC codes 156 (48 bytes in this example) and append the codes to the compressed data blocks at step 208. Thus, the ECC codes remain uncompressed and are subsequently used to detect and correct any errors in the compressed data prior to the decompression step. In this way, the compression engine 126 always decompresses "good" data.

Alternatively, the operations of steps 206 and 208 can be performed in reverse order so that the ECC codes are first calculated for the uncompressed user data. Then, both the uncompressed data and the ECC codes are compressed to form the first data block 156. In this latter case, during a subsequent readback operation the compressed data are decompressed and then the extracted ECC codes are used to correct the extracted user data.

At step 206, the ECC engine 126 operates to calculate the appropriate ECC codes 156 (48 bytes in this example) and append the same to form the first data block 160 (566 bytes). At step 208, the first data block 160 is next compressed by the compression engine 126 (FIG. 4) to provide the compressed data block 162, and the compressed data block 162 is forwarded to the communication channel for further processing.

At step 210, the R/W circuit 132 determines the appropriate write frequency to be employed during the writing of the data. This write frequency is based on the target zone and, when variable frequencies are employed, the size of the compressed data block. For the latter case, it will be noted that the appropriate write frequency can be readily determined on-the-fly by modifying a base write frequency in relation to the length of the compressed data block so as to "stretch" the encoded compressed data so as to occupy substantially the physical length of the data field 152. This calculation can also be supplied by the controller 124.

Pad bits (such as all hexadecimal zeros) can be further appended to the compressed data block during step 210 as desired to bring the total length of the compressed data block up to some target value or range, as discussed above.

Next, conventional RLL encoding, serialization and pre-write compensation are applied by the R/W circuit 132 to the compressed data block to form an NRZI signal at step 212. The NRZI signal is transmitted to the preamp 134 at step 214, which results in the application of appropriate write currents by the selected head 112 (upon the positioning of the head over the target data sector field) to write the compressed data to the data field 152, as depicted in FIG. 5.

An optional, additional operation is shown at step 216 whereby the AGC field 146 of the selected data sector field 144 is also overwritten with a 2T oscillating pattern at the write frequency associated with the writing of data during step 214. Preferably, the synchronization field 148 is also rewritten at this same frequency during step 216. For convenience, step 216 is shown in FIG. 7 to follow step 214, but it will be recognized that the steps will take place sequentially as the head passes adjacent the data sector field.

It will be noted that the ability to write variable frequencies in relation to the length of the compressed data block will depend in part upon the ability of PLL circuitry the R/W circuit 132 to quickly adjust to different commanded frequencies. It is contemplated that it may be difficult in some instances where multiple sectors of data are consecutively written to a selected track to ensure that the frequencies have been properly adjusted for each sector. Thus, in another embodiment some range of acceptable frequencies is initially empirically selected with this range bounded by a minimum frequency, and pad bits are added to "small" compressed data blocks to bring such blocks up to the minimum frequency.

Once the data have been successfully written to the selected data sector field 144, the process then ends at step 218.

Figure 8:
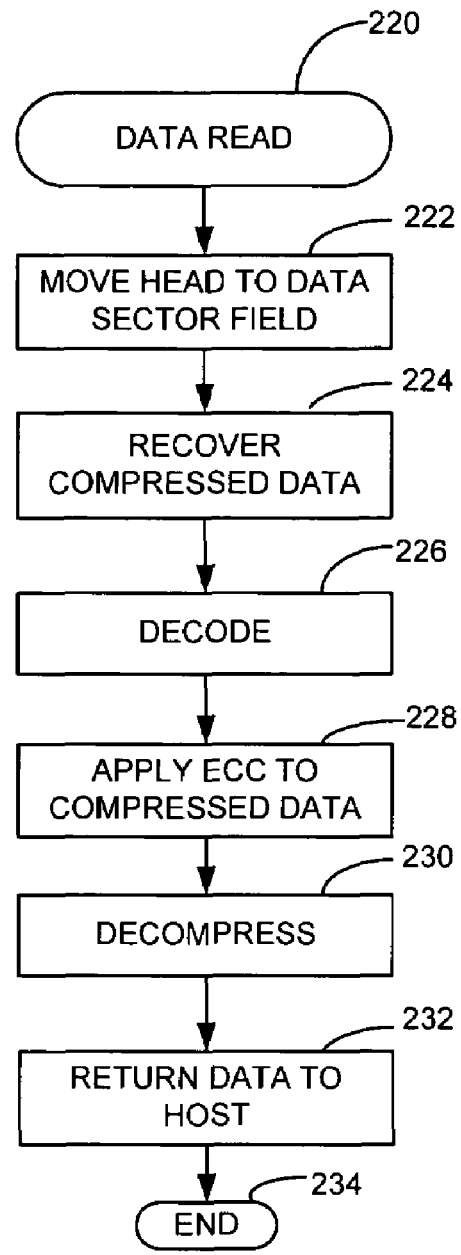
FIG. 8 is a corresponding flow chart for a DATA READ routine, generally illustrative of steps carried out in accordance with preferred embodiments of the present invention to read back data stored by the routine of FIG. 7.

FIG. 8 provides a DATA READ routine 220, generally representative of steps carried out in accordance with preferred embodiments of the present invention to subsequently read back the data stored during the routine of FIG. 7. As before, FIG. 8 describes a generalized sequence, and other steps and ordering of steps may occur as desired.

At step 222, the selected head 112 is first moved so as to be adjacent the selected data sector field 144. At step 224, the head 112 transduces a read back signal from the associated data field 152, and the read back signal is processed by the preamp 134 and the R/W circuit 132 to recover the originally compressed, encoded data.

The data are decoded at step 226 to remove the applied RLL encoding, and the recovered compressed data block is temporarily moved to the buffer 120. Preferably, the ECC engine uses the uncompressed ECC codes at step 228 to detect and correct errors (if any) in the compressed data block, and the compression engine operates at step 230 to decompress the data block to provide an uncompressed data block corresponding to the original user data 154. As discussed above, these steps are reversed if the ECC codes were compressed during the write operation of FIG. 7.

If all detected errors are corrected and the decompression step is carried out successfully, the user data 154 are returned to the host device at step 232, and the process ends at step 234.

The foregoing read and write routines of FIGS. 7 and 8 can be performed for all data sector fields on the storage medium 108, or for only selected fields so that uncompressed data are stored at other locations, as desired. When compression is only applied to some of the data sector fields, preferably such are located in mid-portions of the medium, and uncompressed data are stored at the innermost and outermost (ID and OD) portions of the medium, or vice versa. This advantageously reduces seek times to move the head 112 between the compressed and uncompressed locations.

While presently preferred embodiments have thus far been described as generally involving the storage of one "user data set" (in compressed form) in each data sector field 144 at a reduced write frequency to achieve a lower linear bit density, it will now be apparent that the foregoing process can further be used to achieve higher data storage capacities as well.

Figure 9:
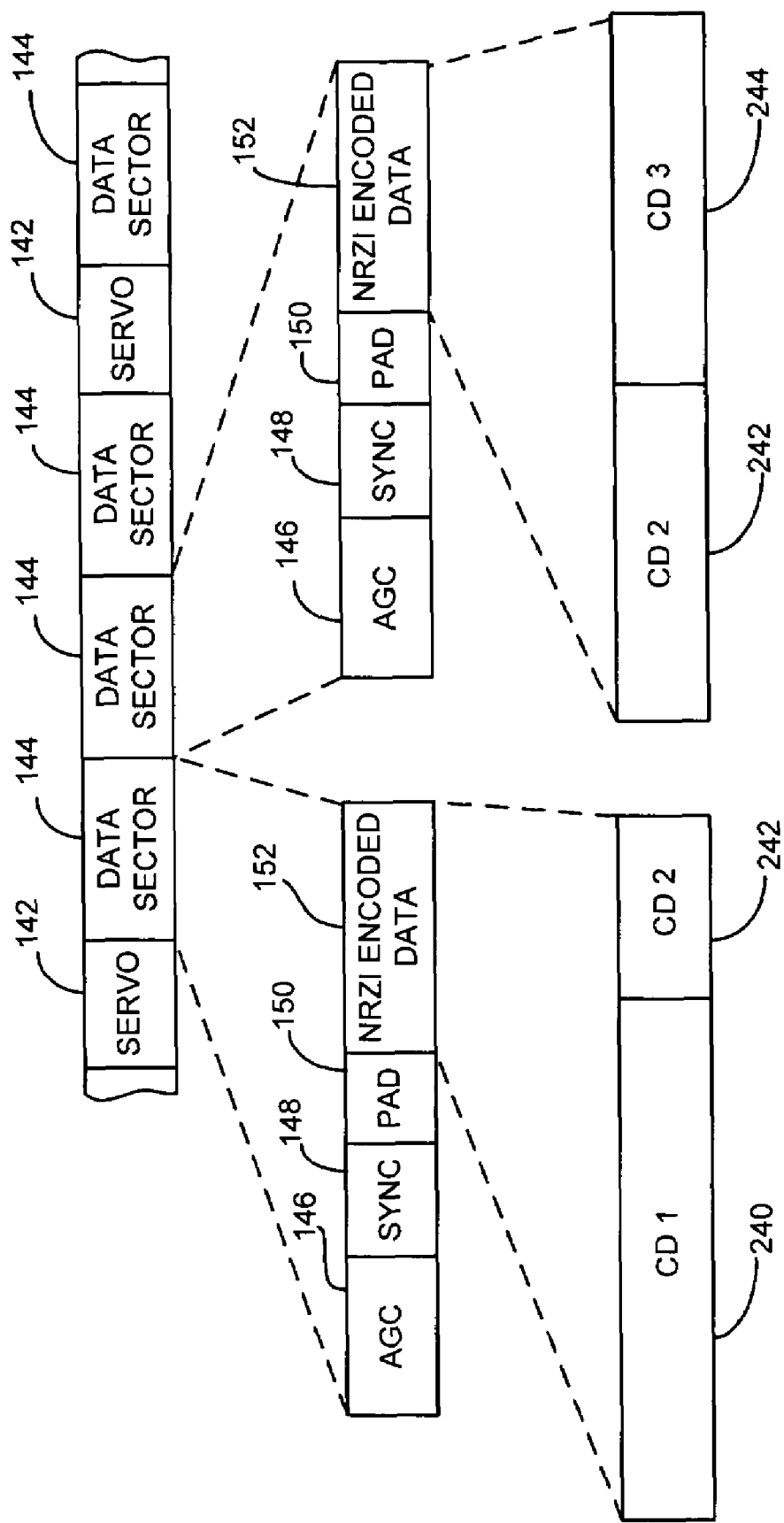
FIG. 9 provides another preferred manner in which compressed data blocks are stored on the data storage medium.

FIG. 9 provides an illustrative representation of an alternative format for the track 140. FIG. 9 is similar to FIG. 5, and shows first and second NRZI encoded data fields 152 in successive data sector fields 144. However, in FIG. 9 some amount of "data slipping" is employed so that a first compressed data block 240 (CD 1), as well as a portion of a second compressed data block 242 (CD2), are stored in the first data field 152. The remaining portion of the second compressed data block 242 (CD2), as well as a first portion of a third compressed data block 244 (CD 3), are stored in the second data field 152, and so on.

A table or similar mechanism (not shown) can readily be employed by the controller 122 to track where the respective compressed data blocks 240, 242, 244 are stored to facilitate subsequent retrieval. It will be noted that, even with a modest amount of slipping (i.e., the space available for the first portion of CD 2 in the first data field 152), this technique advantageously allows a greater number of compressed data blocks to be stored on the discs 108 while still achieving superior SNR ratios and error rates over other compressed and non-compressed data schemes.

Another advantage of preferred embodiments presented herein is that, when the physical lengths of the data sector fields 144 are selected to accommodate an "uncompressed" data block (e.g., 566 bytes of user data and ECC), then for those sectors in which the compression algorithm does not adequately reduce the size of the compressed data block, no adjustments are necessary; that is, the data for that particular sector can be simply written to the data sector field in an uncompressed state. This greatly simplifies overall block management control and allocation since there is no need in these cases to provide certain larger or otherwise specially sized blocks to accommodate the larger data.

Accordingly, it will now be appreciated that the present invention (as embodied herein and as claimed below) is generally directed to a method and apparatus for transferring data to and from a data storage medium.

In accordance with preferred embodiments, the method preferably includes steps of providing a data sector field (such as 144) on a data storage medium (such as 108) with a physical length sufficient to store a first data block (such as 160) at a first write frequency (such as by step 202). The first data block is compressed to provide a compressed data block (such as by step 208). The compressed data block is then written to the data sector field at a second write frequency less than the first write frequency so that the written compressed data block occupies substantially the physical length of said data sector field (such as by step 214).

Preferably, the second write frequency is predetermined or is calculated in relation to a resulting size of the compressed data block (such as by step 210). Moreover, a "data slipping" technique is preferably used so that at least a portion of a second compressed data block (such as 242, 244) is also written to the data sector field.

In accordance with further preferred embodiments, an apparatus (such as 100) comprises a data storage medium (such as 108) on which a data sector field (such as 144) is formed having a data storage memory space (such as 152) sized to accommodate a selected amount of data written at a first write frequency (such as 170). A compression engine (such as 124) compresses a first data block (such as 160) to provide a compressed data block (such as 162), the first data block having a size equal to said selected amount of data.

A communication channel (such as 132, 134, 112) subsequently writes the compressed data block to the data sector field at a second write frequency (such as 172) less than the first write frequency so that the written compressed data block is provided with a reduced linear bit density as compared to a linear bit density that would be achieved by writing the first data block to the data sector field at the first frequency. In this way, higher SNR ratios and lower error rates can be advantageously achieved in the communication channel.

Preferably, the communication channel additionally writes at least a portion of a second compressed data block (such as 242, 242) to the data sector field. In this way, higher data storage capacities are also further achieved.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

In addition, although the embodiments described herein are directed to the storage and retrieval of compressed data in a disc drive data storage device, it will be appreciated by those skilled in the art that the invention can be used for various other types of applications without departing from the spirit and scope of the claimed invention.

What is claimed is:

1. A method, comprising:
providing a data sector field on a data storage medium with a physical length sufficient to store a first data block at a first write frequency;
compressing the first data block to provide a compressed data block; and
writing the compressed data block to the data sector field at a second write frequency less than the first write frequency so that the written compressed data block occupies substantially the physical length of said data sector field.

2. The method of claim 1, wherein the first data block comprises user data received from a host device for storage to the data sector field.

3. The method of claim 1, wherein the providing step further comprises providing the data sector field with an automatic gain control (AGC) field to which an oscillating pattern is written at the first write frequency.

4. The method of claim 1, wherein the providing step further comprises providing the data sector field with an automatic gain control (AGC) field, and wherein the AGC field stores an oscillating pattern written at the second write frequency.

5. The method of claim 4, wherein the compressing step further comprises calculating the second write frequency in relation to a resulting size of the compressed data block.

6. The method of claim 1, further comprising:
subsequently reading the data sector field at a readback frequency substantially equal to the second write frequency to obtain a recovered compressed data block; and
uncompressing the recovered compressed data block to provide a recovered data block nominally equal to the first data block.

7. The method of claim 1, wherein the data sector field is characterized as a first data sector field, and wherein the providing step further comprises providing a plurality of additional data sector fields on the data storage medium each nominally identical to the first data sector field.

8. The method of claim 1, wherein the first data block is composed of a selected one of 512, 1024 or 4096 total bytes of user data.

9. The method of claim 8, wherein the first data block is further composed of a plurality of error correction code (ECC) bytes generated in relation to the total bytes of user data so that both the total bytes of user data and the plurality of ECC bytes are compressed to form the compressed data block.

10. The method of claim 1, further comprising a step of calculating a plurality of error correction code (ECC) bytes in relation to the compressed data block, and wherein the writing step further comprises additionally writing the plurality of ECC bytes in uncompressed form to the data sector field.

11. The method of claim 1, wherein the writing step further comprises additionally writing at least a portion of a second compressed data block to the data sector field.

12. The method of claim 1, wherein the writing step further comprises adding an additional number of pad bytes to the compressed data block to obtain a predetermined, total byte count.

13. An apparatus, comprising:
- a data storage medium on which a data sector field is formed having a data storage memory space sized to accommodate a selected amount of data written at a first write frequency;
- a compression engine which compresses a first data block to provide a compressed data block, the first data block having a size equal to said selected amount of data; and
- a communication channel coupled to the compression engine and the data storage medium which writes the compressed data block to the data sector field at a second write frequency less than the first write frequency so that the written compressed data block is provided with a reduced linear bit density as compared to a linear bit density that would be achieved by writing the first data block to the data sector field at the first frequency.

14. The apparatus of claim 13, wherein the first data block comprises user data received from a host device for storage to the data sector field.

15. The apparatus of claim 13, wherein the data sector field further comprises an automatic gain control (AGC) field, and wherein the communication channel further writes an oscillating pattern at the second write frequency to the AGC field when the compressed data block is written.

16. The apparatus of claim 15, further comprising a write frequency calculation unit which calculates the second write frequency in relation to a resulting size of the compressed data block.

17. The apparatus of claim 13, wherein the communication channel subsequently reads the data sector field at a readback frequency substantially equal to the second write frequency to obtain a recovered compressed data block.

18. The apparatus of claim 17, wherein the compression engine subsequently uncompresses the recovered compressed data block to provide a recovered data block nominally equal to the first data block.

19. The apparatus of claim 13, wherein the data storage medium comprises a magnetic recording disc.

20. The apparatus of claim 13, wherein the data sector field is characterized as a first data sector field, and wherein the data storage medium further has a plurality of additional data sector fields on the data storage medium each nominally identical to the first data sector field.

21. The apparatus of claim 13, wherein the first data block is composed a selected one of 512, 1024 or 4096 total bytes of user data.

22. The apparatus of claim 21, wherein the first data block is further composed of a plurality of error correction code (ECC) bytes generated in relation to the total bytes of user data so that both the total bytes of user data and the plurality of ECC bytes are compressed to form the compressed data block.

23. The apparatus of claim 13, further comprising an error correction code (ECC) engine which calculates a plurality of ECC bytes in relation to the compressed data block, and wherein the communication channel additionally writes the plurality of ECC bytes in uncompressed form to the data sector field.

24. The apparatus of claim 13, wherein the communication channel additionally writes at least a portion of a second compressed data block to the data sector field.

25. The apparatus of claim 13, wherein the first data block consists of a first number of bits, wherein the compressed data block consists of a second number of bits, and wherein the second number of bits is equal to at least 0.90 times the first number of bits.

26. The apparatus of claim 13, wherein the communication channel further adds an additional number of pad bytes to the compressed data block to obtain a predetermined, total byte count.

27. An apparatus, comprising:
- a data storage medium on which a data sector field is formed having a physical length sufficient to store a first data block at a first write frequency and thereby provide a first linear bit density; and
- means for using data compression to store a compressed representation of the first data block to the data sector field at a second linear bit density less than the first linear bit density.

* * * * *